United States Patent
Kim

(10) Patent No.: US 6,195,074 B1
(45) Date of Patent: Feb. 27, 2001

(54) THREE ELECTRODES FACE DISCHARGE TYPE COLOR PLASMA PANEL

(75) Inventor: Se-Yong Kim, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/240,683

(22) Filed: Feb. 2, 1999

(30) Foreign Application Priority Data

Jun. 20, 1998 (KR) .............................................. P98-25729

(51) Int. Cl.[7] .................................................... G09G 3/28
(52) U.S. Cl. ................. 345/67; 345/60; 345/71; 345/68; 345/37; 315/169.4
(58) Field of Search ................. 345/67, 60, 71, 345/37, 68; 315/169.4

(56) References Cited

U.S. PATENT DOCUMENTS

| | | | |
|---|---|---|---|
| 4,044,349 | * | 8/1977 | Andoh ..................................... 345/61 |
| 5,790,087 | * | 8/1998 | Shigeta et al. ......................... 345/67 |
| 5,825,128 | * | 10/1998 | Betsui et al. .......................... 313/582 |
| 5,828,356 | * | 10/1998 | Stoller ..................................... 345/60 |
| 5,877,734 | * | 3/1999 | Amemiya ............................... 345/60 |
| 5,952,986 | * | 9/1999 | Nguyen et al. ......................... 345/68 |
| 6,034,482 | * | 3/2000 | Kanazawa et al. ................ 315/169.4 |
| 6,054,970 | * | 4/2000 | Hirakawa et al. ...................... 345/60 |
| 6,097,357 | * | 8/2000 | Shinoda et al. ......................... 345/63 |
| 6,100,939 | * | 8/2000 | Kougami et al. ..................... 348/687 |

FOREIGN PATENT DOCUMENTS

| | | |
|---|---|---|
| 554 172 A1 | 8/1993 | (EP) . |
| 2 755 785 | 5/1998 | (FR) . |

* cited by examiner

Primary Examiner—Richard A. Hjerpe
Assistant Examiner—Alexander Eisen
(74) Attorney, Agent, or Firm—Pillsbury Madison & Sutro LLP

(57) ABSTRACT

A three electrodes face discharge color plasma display panel (PDP) is disclosed. The three electrodes face discharge color PDP comprises a front glass substrate, a back glass substrate, a plurality of partition walls, a plurality of scanning and sustaining electrode lines, a plurality of common sustaining electrode lines, and a plurality of address electrode lines. The plurality of scanning and sustaining electrode lines are formed on the front glass substrate. The common sustaining electrode lines and the adress electrode lines are formed on the back glass substrate. Therefore, the brightness of the whole picture can be enhanced as an intensity of a visible light passing the front substrate increases. Also, a discharge interference occuring between adjacent cells can be minimized as a discharge region of a discharge space is formed up and down.

14 Claims, 7 Drawing Sheets

THREE ELECTRODES FACE DISCHARGE TYPE COLOR PLASMA PANEL

BACKGROUND OF THE INVENTION

1. Field of the Invention

The present invention relates to a plasma display panel, and more particularly to a three electrodes face discharge type color plasma display panel in which three electrodes forming a discharge cell are arranged to generate an address discharge and a face sustaining discharge in a discharge space of the discharge cell.

2. Description of the Prior Art

Generally, a plasma display panel (hereinafter simply referred to as PDP) is a planer display panel which makes a discharge phenomenon by using a mixed penning gas. That is, the PDP generates a luminescence by discharging gases based on Helium (He) or Neon (Ne) having a relatively high atmosphere pressure (above 100 Torr.) between electrodes which are closely arranged to each other and are coated with a dielectric substance.

The mixed penning gas mainly consists of Ne+Xe or Ne+He+Xe. The reason for using the mixed gas is that the mixed gas has a lower discharge start voltage as compare with that of a pure gas. The discharge start voltage varies according to sorts of gases, a pressure of the penning gas and a structure or shape of the panel.

The above PDP has following advantages as compare with other display devices.

First of all, the PDP can be manufactured as a large size because it can variously take the address lines and the scanning lines. In addition, the PDP can adopt a multiplex technique so that the driving circuits thereof can be reduced. Further, the PDP has a longer life span of 50,000 hours than a cathode ray tube (CRT) which has a life span of 20,000 hours.

In addition, the PDP has a simple construction and is adapted to mass production since it has no fragile parts except for a glass. The PDP has a non-linear shape, so it has a high quality resolution of 100 line/inch. Since the gas having a refractive index of "1" is discharged in the PDP, a light is not extinguished while being reflected in the PDP and an external light cannot be reflected or scattered by indicating materials. In addition, unlike other flat panels, the PDP is sealed by the glass in the atmosphere above 400° C. so that the PDP can be operated even when it is subjected to a high humidity or even when an active gas exists.

The PDP is divided into an AC type PDP and a DC type PDP according to a pattern of a driving voltage applied to the discharge cell. In the AC type PDP driven by a volts alternating current, the electrode is coated with an dielectric substance of a glass. On the other hand, in the DC type PDP, the electrode is not coated with the dielectric substance and a discharge current is generated when a discharge voltage is applied to the electrode.

FIG. 1 is a exploded perspective view for showing a conventional three electrode surface discharge type plasma display panel, FIG. 2 is a structural view of a whole electrode for showing a conventional three electrode surface discharge type plasma display panel having a resolution of 853×480, FIG. 3 is a cross-sectional view of a cell $R_{ij}$ (i is a column and j is a row) of a conventional three electrodes surface discharge type plasma display panel taken along line $A_1$–$A_2$ of FIG. 2, FIG. 4 is a cross-sectional view of a cell $R_{ij}$ (i is a column and j is a row) of a conventional three electrodes surface discharge type plasma display panel taken along line $B_1$–$B_2$ of FIG. 2.

Referring to FIG. 1, the conventional three electrodes face discharge type plasma display panel has a front glass substrate 10, a back glass substrate 20, a plurality of partition walls 30, a plurality of scaninig and sustaining electrode lines Y, a plurality of common sustaining electrode lines X, a dielectric layer 11, a magnesium oxide (MgO) protection film 12, a plurality of address electrode lines 15, and R, G and B fluorescent layers 21a, 21b and 21c.

The front glass substrate 10 and the back glass substrate 20 are parallely arranged at a predetermined interval. The plurality of partition walls 30 are arranged between the front glass substrate 10 and the back glass substrate 20 at a predetermined interval to form a plurality of discharge spaces.

The scanning and sustaining electrode lines Y are arranged at a predetermined interval on the front grass substrate 10 facing the back glass substrate 20 in a direction perpendicular to partition walls 30. The plurality of common sustaining electrode lines X and the scanning and sustaining electrode lines Y are arranged in pairs and generate a sustaining discharge in the discharge spaces.

The dielectric layer 11 is formed on the plurality of common sustaining electrode lines X and the scanning and sustaining electrode lines Y so as to limit a discharge current and so as to generate a wall charge easily. The MgO protection film 12 is formed on the dielectric layer 11 in order to protect the common sustaining electrode lines X and the scaning and sustaining electrode lines Y. Also, the MgO protection film prevents the dielectric layer 11 from being eroded and corroded.

The plurality of address electrode lines 15 are parallely formed with the partition walls 30 on the back glass substrate 20 and generate the address discharge in the discharge spaces together with the sustaining electrode lines Y.

The R, G and B fluorescence layers 21a, 21b and 21c are respectively formed on the address electrode lines 15. When the sustaining discharge is generated by the common sustaining electrode lines X and the scanning and sustaining electrode lines Y, R, G and B visible lights are emitted from the R, G and B fluorescent layers 21a, 21b and 21c as the R, G and B fluorescent layer 21a, 21b, 21c are excited by vacuum ultreviolet rays.

Referring to FIG. 2, four hundred eighty scanning and sustaining electrode lines Y1–Y480 and four hundred eighty common sustaining electrode lines X1–X480 are alternately arranged one by one on the same plane (on the front glass substrate). Two thousands five hundred fifty nine (853×3 (R, G and B)) address electrode lines R1, G1, B1, . . . , R853, G853 and B853 are arranged on the back glass substrate 20 such that they can be perpendicular to the scanning and sustaining electrode lines Y1–Y480 and the common sustaining electrode lines X1–X480 at a predetermined interval therebetween. R, G and B cells 50, 51 and 52 are alternately formed at each intersection of the scanning and sustaining electrode lines Y1–Y480 and the common sustaining electrode lines X1–X480 and address electrode lines R1, G1, B1, . . . , R853, G853 and B853. Accordingly, 1,228,320 (480×853×3) R, G and B cells have a matrix shape.

Referring to FIGS. 3 and 4, a scanning and sustaining line Yi and a common sustaining electrode line Xi are parallely formed on the front glass substrate 10 facing the back glass substrate 20. A dielectric layer 11 having a predetermined thickness is formed on the scanning and sustaining electrode line Yi and the common sustaining electrode line Xi. The MgO protection film 12 is formed on the dielectric layer 11.

In addition, a first partition wall 30a and a second partition wall 30b are perpendicularly arranged with the scanning and sustaining electrode line Yi between the front glass substrate 10 and the back glass substrate 20 in order to form a discharge space and prevent colors of cells from mixing with each other. An address electrode line Rj is formed on the back blass substrate 20 formed between the first partition wall 30a and the second partition wall 30b. The R fluorescent layer 21a is formed on the address electrode line Rj. Inside of the discharge space is filled with a penning mixed gas.

The above-mentioned R cell operates as follows.

The address discharge is generated between the scanning and sustaining electrode line Yi and the address electrode line Rj and charge particles are generated within the discharge space by the address discharge. By the charge particles, optimum wall charges are generated on a surface of each of the electrode lines Yi, Rj. When the optimum wall charges are generated, the sustaining discharge is continuously generated between the scanning and sustaining electrode line Yi and the common sustaining electrode line Xi. Therefore, R vacuum ultraviolet rays are generated by the sustaining discharge so that R fluorescence layer 21a is excited by the vacuum ultraviolet rays, thereby generating R visible rays. In this manner, if the R visible rays generated in the discharge space of the R cell are emitted to an exterior through the front grass substrate 10, the luminescence of the R cell can be recognized.

Since a discharge area in the discharge space is formed between the scanning and sustaining electrode line Yi and the common sustaining electrode line Xi which are formed on the front glass substrate 10 in parallel to each other, it is called "face discharge type PDP".

Although the R cell is described as an example above, internal structures of the G cell and the B cell are almost identical to that of the R cell, except for the G cell and the B cell respectively have the G fluorescence layer 21b and the B fluorescence layer 21c instead of the R fluorescence layer 21a.

However, the conventional three electrodes face discharge type plasma display panel has so many scanning and sustaining electrode lines and common sustaining electrode lines on the front glass substrate that the visible light, which is generated in the discharge space and passes through the front glass substrate, is interrupted by the scanning and sustaining electrode lines and the common sustaining electrode lines. As a result, an amount of the visible light passing through the front glass substrate is reduced so that a brightness of the cell as well as an image can be deteriorated.

In addition, in order to allow the scanning and sustaining electrode lines and the common sustaining electrode lines to generate the face discharge with one another, the discharge area in the discharge space is horizontally formed in the conventional three electrodes face discharge type PDP. For this reason, there occurs a discharge interference between adjacent cells.

Furthermore, in the conventional three electrodes face discharge type plasma display panel, a luminescence efficiency of the R fluorescence is higher than that of the B fluorescence, and a luminescence efficiency of the G fluorescence is higher than that of the fluorescence. Accordingly, if the R, G, and B cells are operated in the same condition with the same structure, the brightness thereof will be presented as the G cell>the R cell>the B cell. Therefore, a white balance is unstable, that is, when a white color is projected, a white-green color may be presented.

SUMMARY OF THE INVENTION

Accordingly, considering the conventional problems as described above, it is the first object of the present invention to provide a three elesctrodes face discharge color PDP effectively enhancing a brightness of a whole picture by increasing an intensity of a visible light passing a front glass substrate as common sustaining electrode lines are formed on a back glass substrate.

Also, it is the second object of the present invention to provide the three electrodes face discharge color plasma display panel effectively preventing a discharge interference from occuring between adjacent cells by a face discharge generated by scanning and sustaining electrode lines and common sustaining electrode lines within discharge spaces as the common sustaining electrode lines are formed on the back glass substrate.

Also, it is the third object of the present invention to provide the three electrodes face discharge color plasma display panel effectively preventing an unstable white balance from occuring by a difference of the luminescence characteristics of R, G, B fluorescent bodies as R, G, B visible lights are generated by R, G, B filters and white fluorescent bodies instead of the R, G and B fluorescent bodies.

To accomplish the above objects, there is provided in the present invention a three electrodes face discharge color PDP comprising a front glass substrate and a back glass substrate parallely arranged at a predeterminated interval, a plurality of partition walls arranged between the front glass substrate and the back glass substrate to form a plurality of discharge spaces, a plurality of scanning and sustaining electrode lines arranged at a predeterminated interval on the front glass substrate facing the back glass substrate in a direction perpendicular to the partition walls, a plurality of address electrode lines parallely formed with the partition walls on the back glass substrate, wherein an address discharge is generated by the address electrode lines and the scanning and sustaining electrode lines, and a plurality of common sustaining electrode lines parallely formed with the partition walls on the back glass substrate, wherein a face sustaining discharge is generated by the common sustaining electrode lines and the scanning and sustaining electrode lines. Preferably, the plasma display panel further comprises R,G and B cells alternately formed at each intersection of the scanning and sustaining electrode lines and the address electrode lines.

According to an embodiment 1 of the present invention, the three electrodes face discharge color PDP further comprises fluorescent layers formed on said address electrode lines of the R,G and B cells, wherein the fluorescent layers comprise a) red (R) fluorescent layers formed on the address electrode lines of the R cells, wherein R fluorescent layers emit a red visible light as the R fluorescent layers are excited by a vacuum ultraviolet occuring when a face sustaining discharge is generated between the scanning and sustaining electrode lines and the common sustaining electrode lines b) green (G) fluorescent layers formed on the address electrode lines of the G cells, wherein G fluorescent layers emit a green visible light as the G fluorescent layers are excited by the vacuum ultraviolet and c) blue (B) fluorescent layers formed on the address electrode lines of the B cells, wherein B fluorescent layers emit a blue visible light as the B fluorescent layers are excited by the vacuum ultraviolet. Also, the R,G and B fluorescent layers are formed on the common sustaining electrode lines and said address electrode lines formed within the discharge spaces.

According to an embodiment 2 of the present invention the three electrodes face discharge color PDP further comprises white fluorescent layers formed on the address electrode lines, wherein the white fluorescent layers emit a white visible light as the white fluorescent layers are excited by the vacuum ultraviolet occuring when the face sustaining discharge is generated between the scanning and sustaining electrode lines and the common sustaining electrode lines. Also, the plasma display panel further comprising a plurality of filters formed on the front glass substrate. The filters comprise a) R filters formed on the front glass substrate formed between two partition walls of the R cells, wherein the R filters pass the red visible light of a white visible light emitted from the white fluorescent layer into an outside b) G filters formed on the front glass substrate formed between two partition walls of the G cells, wherein the G filters pass green visible light of a white visible light emitted from the white fluorescent layer into the outside c) B filters formed on the front glass substrate formed between two partition walls of the B cells, wherein the B filters pass said blue visible light of a white visible light emitted from the white fluorescent layer into the outside.

BRIEF DESCRIPTION OF THE DRAWINGS

The above objects and advantages of the present invention will become more apparent by describing in detail preferred embodiments thereof with reference to the attached drawings, in which.

DETAILED DESCRIPTION OF THE INVENTION

Hereinafter, the preferred embodiments of the present invention will be explained in more detail with reference to the accompanying drawings.

Figure 1:
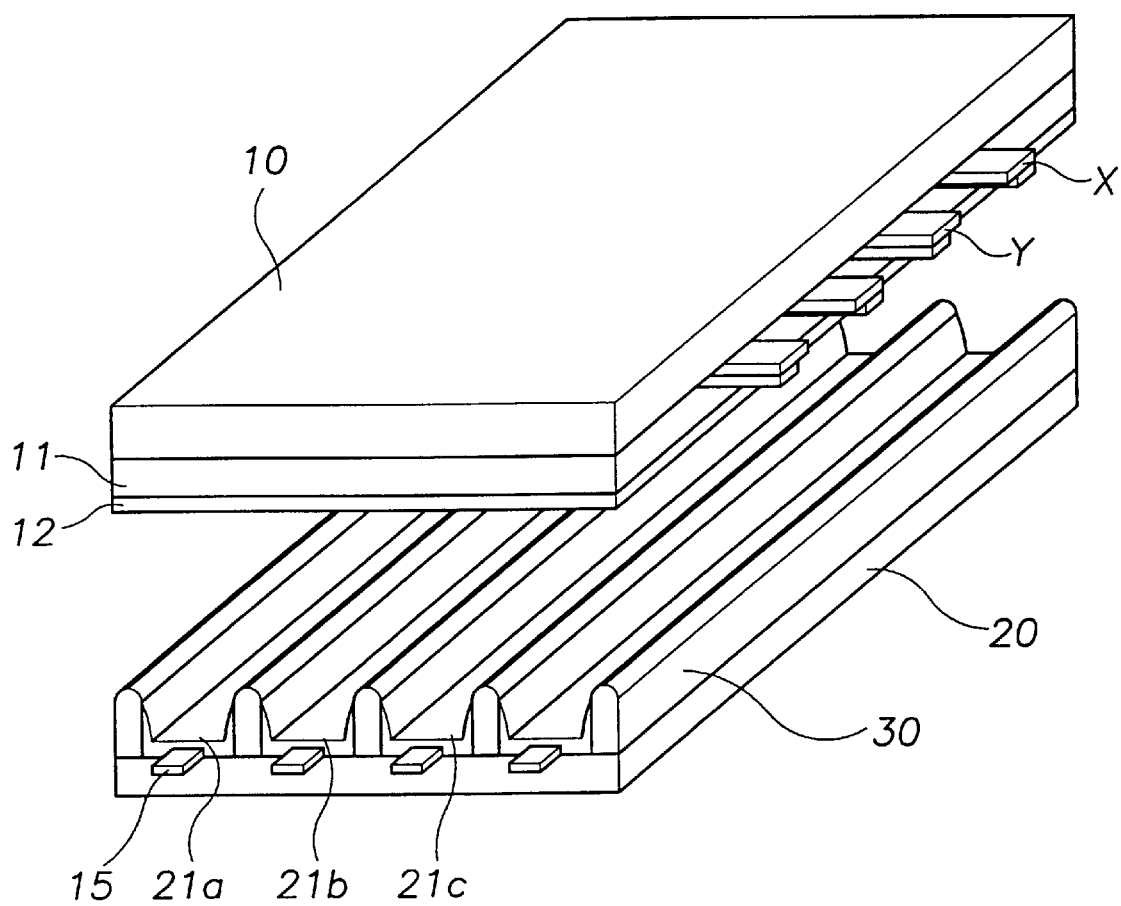
FIG. 1 is an exploded perspective view for showing a conventional three electrode surface discharge type PDP.
Figure 2:
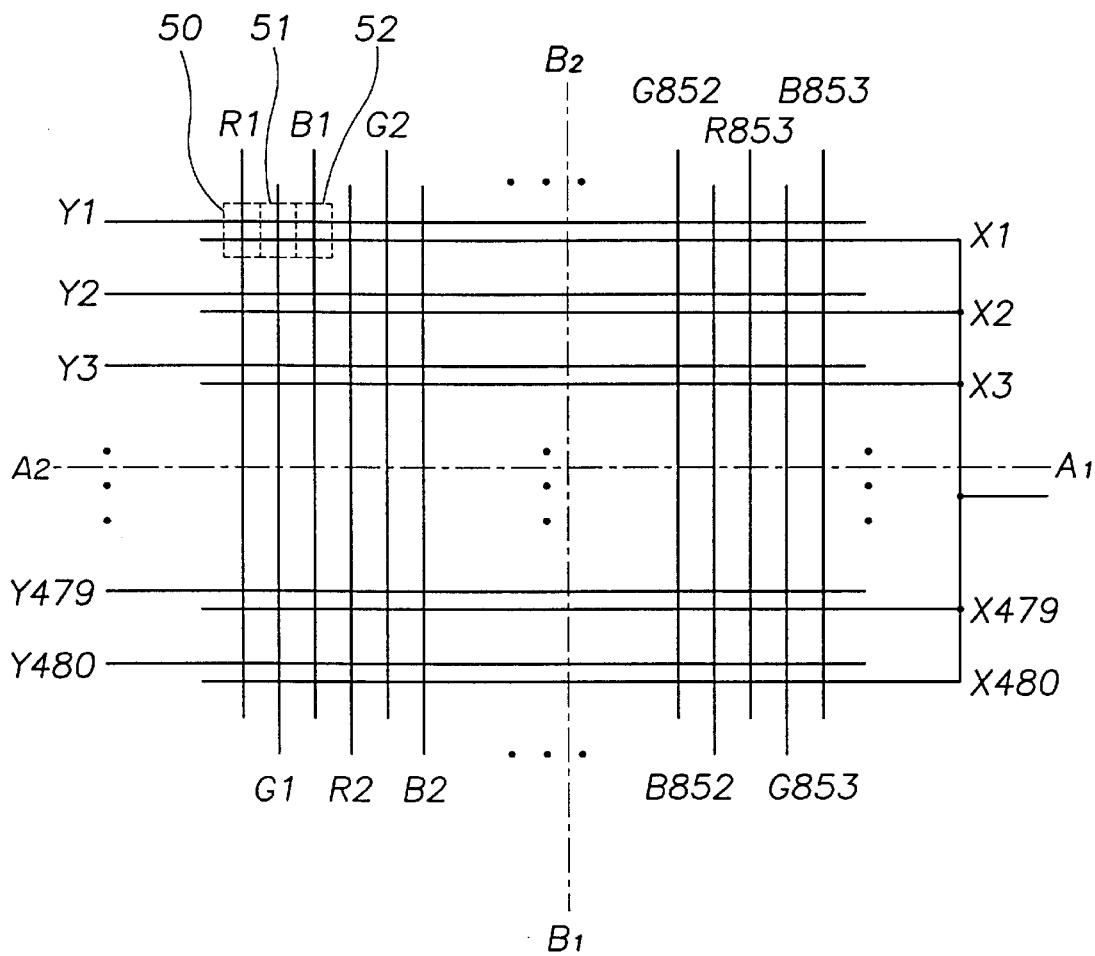
FIG. 2 is a structural view of a whole electrode for showing a conventional three electrode surface discharge type PDP having a resolution of 853×480.
Figure 3:
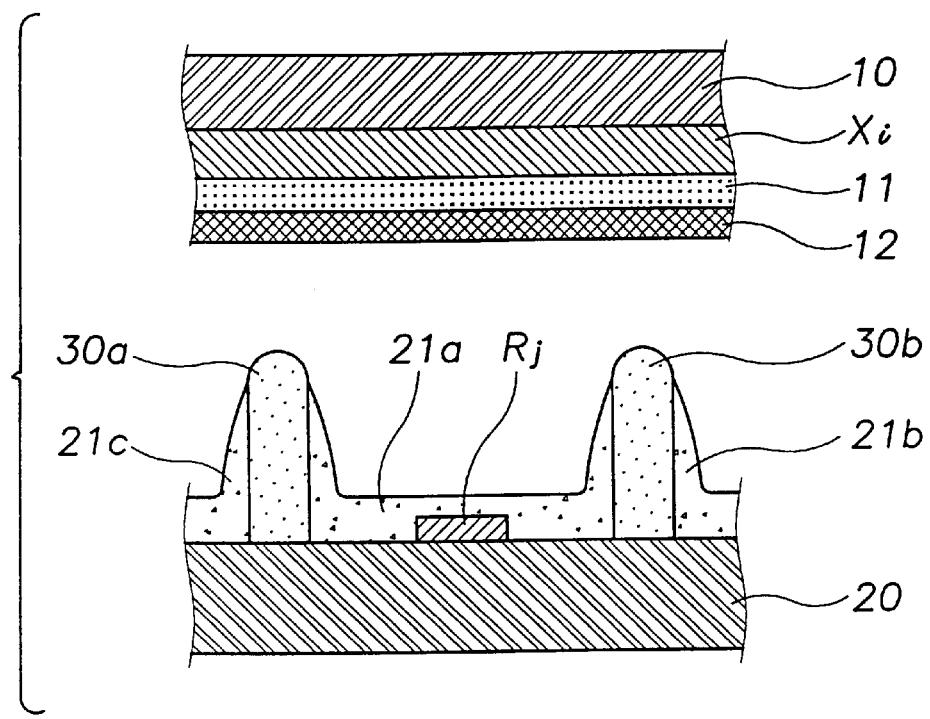
FIG. 3 is a cross-sectional view of a cell $R_{ij}$ (i is a column and j is a row) of a conventional three electrodes surface discharge type PDP taken along line $A_1$–$A_2$ of FIG. 2.
Figure 4:
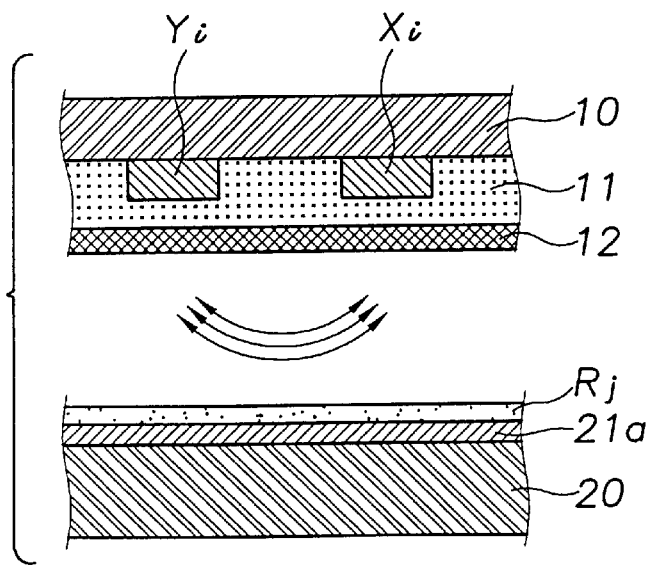
FIG. 4 is a cross-sectional view of a cell $R_{ij}$ (i is a column and j is a row) of a conventional three electrodes surface discharge type PDP taken along line $B_1$–$B_2$ of FIG. 2.
Figure 5:
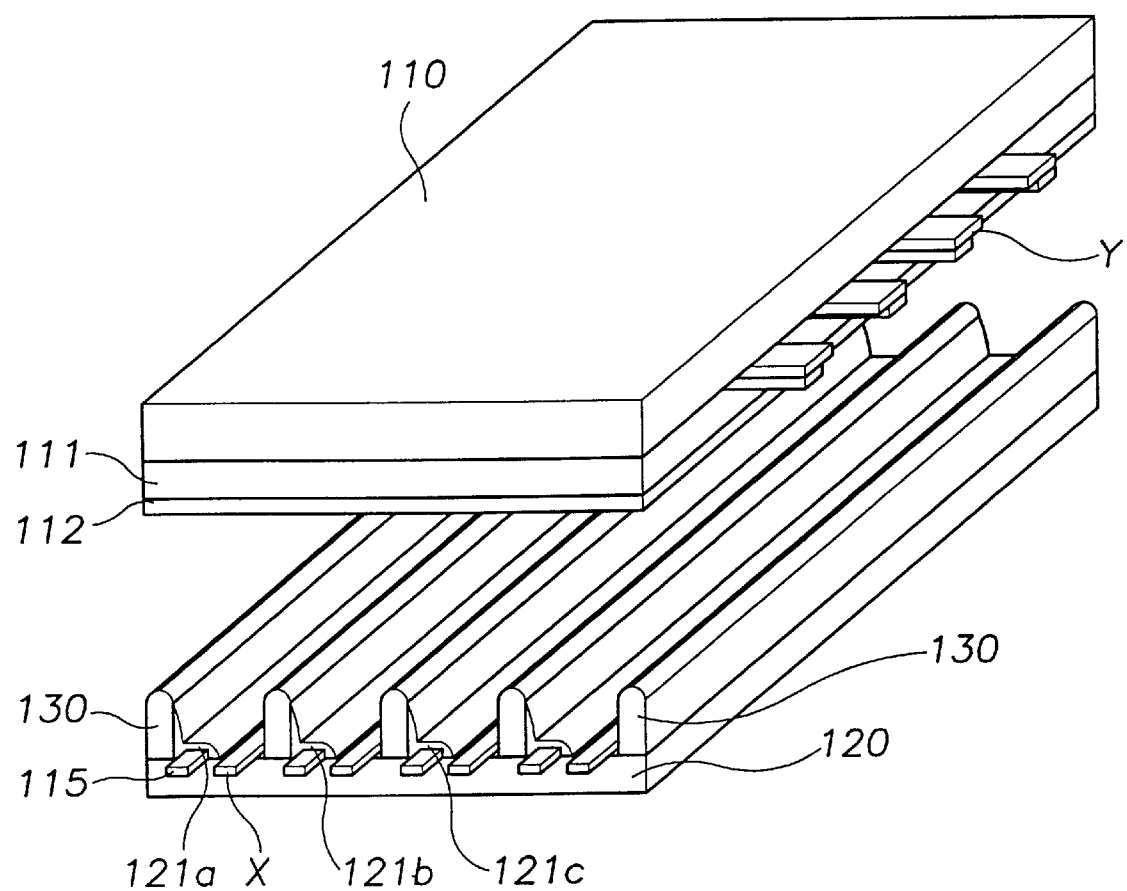
FIG. 5 is an exploded perspective view for showing a three electrodes face discharge type color PDP according to the present invention.
Figure 6:
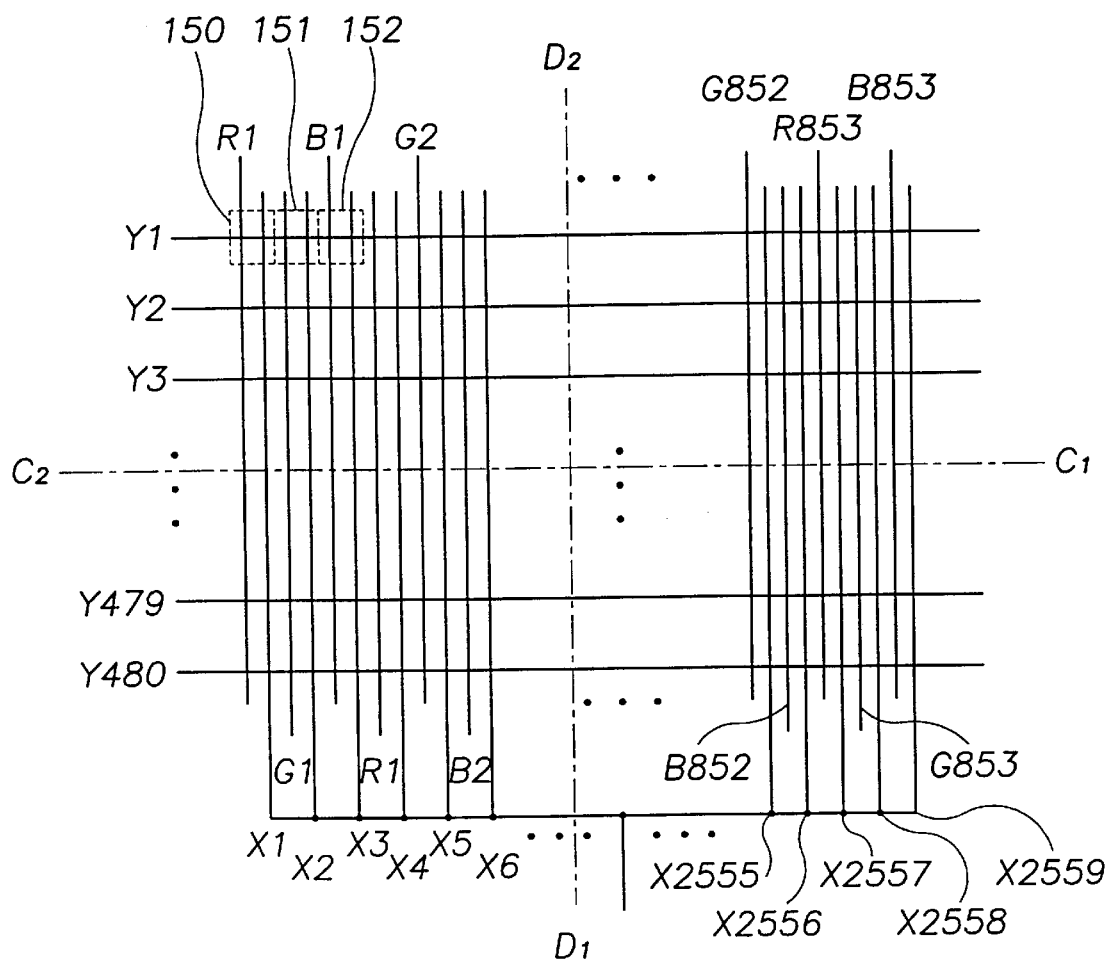
FIG. 6 is a structural view of a whole electrode for showing a three electrodes face discharge type color PDP having an 853×480 resolution according to the present invention.

FIG. 5 is a perspective view for showing a three electrodes face discharge color plasma display panel according to the present invention, FIG. 6 is a structural view of a whole electrode for showing the three electrodes face discharge type color plasma display panel having an 853×480 resolution according to the present invention.

Referring to FIG. 5, the three electrodes face discharge type color plasma display panel comprises a front glass substrate 110, a back glass substrate 120, a plurality of partition walls 130, a plurality of scanning and sustaining electrode lines Y, a plurality of common sustaining electrode lines X, a dielectric layer 111, a magnesium oxide (MgO) protection film 112, a plurality of address electrode lines 115, and R,G and B fluorescent layers 121a,121b and 121c.

The front glass substrate 110 and the back glass substrate 120 are parallely arranged at a predeterminated interval. The plurality of partition walls 130 are arranged between the front glass substrate 110 and the back glass substrate 120 to form a plurality of discharge spaces.

The plurality of scanning and sustaining electrode lines Y are arranged at a predeterminated interval on the front glass substrate 110 facing the back glass substrate 120 in a direction perpendicular to the partition walls 130. The plurality of common sustaining electrode lines X and the plurality of address electrode lines 115 are parallely formed with the partition walls 130 on the back glass substrate 120.

The dielectric layer 111 is formed on the scanning and sustaining electrode lines Y so as to limit a discharge current and creat a wall charge easily. The MgO protection film 112 is formed on the dielectric layer 111 in order to protect the scanning and sustainig electrode lines Y. Also, the MgO protection film 112 prevents the dielectris layer 111 from being eroded and corroded.

The R,G and B fluorescent layers 121a,121b and 121c are respectively formed on the scanning and sustaining electrode lines 115. When a sustaining discharge is generated by the scanning and sustaining electrode lines Y and the common sustaining electrode lines X, R, G and B visible rays are emitted from the R,G,B fluorescent layers 121a,12ab and 121c as the R, G and B fluorescent layers 121a,121b and 121c are excited by vacuum ultraviolet rays.

Referring to FIG. 6, two thousand five hundred fifty nine(853×3(R,G,B)) address electrode lines R1,G1,B1, . . . ,R853,G853,B853 and two thousand five hundred fifty nine common sustaining electrode lines X1 . . . X2559 are alternately arranged one by one on the same plane(on the back glass substrate). Four hundred eighty scanning and sustaining electrode lines are arranged on the front glass substrate 110 such that they can be perpendicular to the address electrode lines R1,G1,B1, . . . ,R853,G853,B853 and the common sustaining electrode lines X1 . . . X2559 at a predetermined interval therebetween. R, G and B cells 150,151 and 152 are alternately formed at each intersection of the scanning and sustaining electrode lines Y1 . . . Y480 and each pairs of the address electrode lines R1,G1, B1, . . . ,R853,G853,B853 and the common sustaining electrode lines X1 . . . X2559. Therefore, the R, G and B cells 150, 151 and 152 have a matrix shape, the number of the R,G and B cells is 1,228,320 (480×853×3).

Embodiment 1

Figure 7:
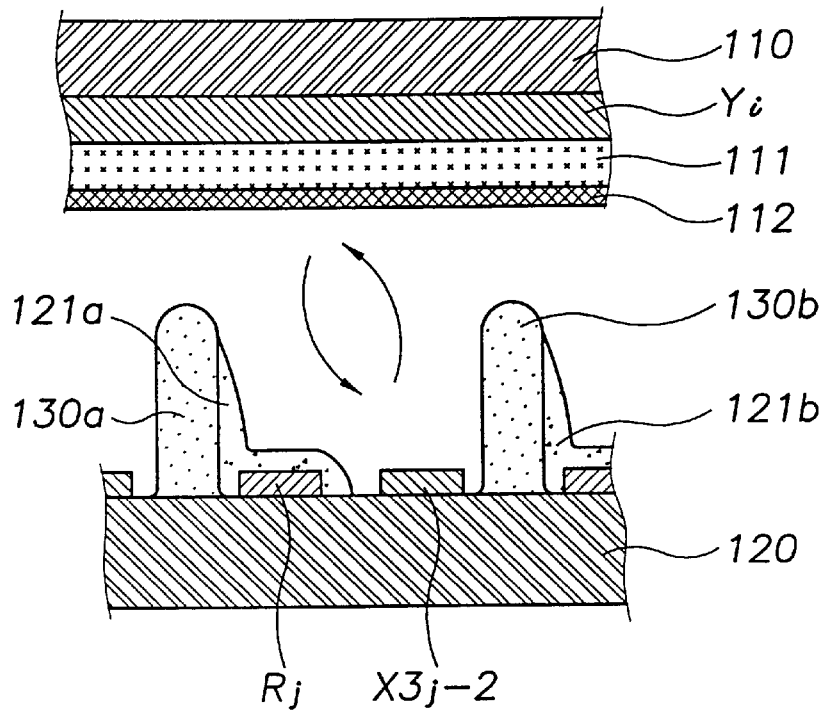
FIG. 7 is a cross-sectional view of a cell $R_{ij}$ (i is a column and j is a row) by embodiment 1 of the present invention taken along line $C_1$–$C_2$ of FIG. 6.
Figure 8:
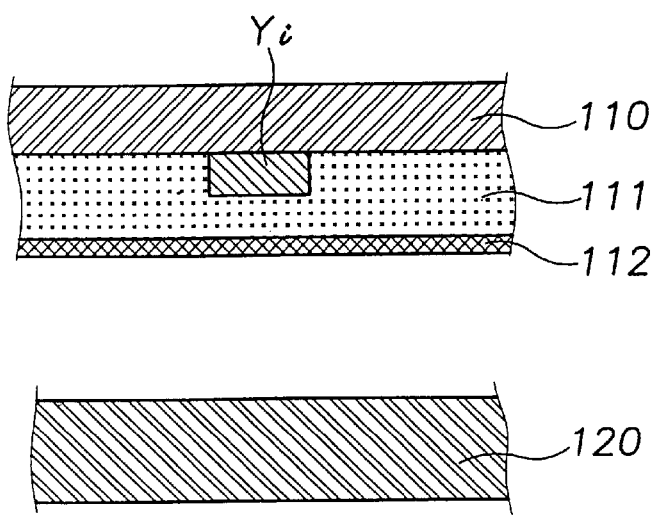
FIG. 8 is a cross-sectional view of a cell $R_{ij}$ (i is a column and j is a row) by embodiment 1 of the present invention taken along line $D_1$–$D_2$ of FIG. 6.

FIG. 7 is a cross-sectional view of $R_{ij}$ (i is a column and j is a row) by an embodiment 1 of the present invention taken along line $C_1$–$C_2$ of FIG. 6, FIG. 8 is a cross-sectional view of $R_{ij}$ (i is a column and j is a row) by an embodiment 1 of the present invention taken along line $D_1$14 $D_2$ of FIG. 6.

Referring to FIGS. 7 and 8, the front glass substrate 110 and the back glass substrate 120 are parallely arranged at a predetermined interval. A scanning and sustaining electrode line Yi is arranged on the front glass substrate 110 facing the back glass substrate 120. the dielectric layer 111 is formed on the scanning and sustaining electrode lines Y so as to limit a discharge current and creat a wall charge easily. The MgO protection film 112 is formed on the dielectric layer 111 in order to protect the scanning and sustainig electrode line Yi. Also, the MgO protection film 112 prevents the dielectris layer 111 from being eroded and crroded.

A first partition wall 130a and a second partition wall 130b are arranged between the front glass substrate 110 and the back glass substrate 120 in order to form a discharge space and prevent adjacent cells from mixing. An address electrode line Rj and a common sustaining electrode X3j-2 line are parallely formed on the back glass substrate 120. A R fluorescent layer 121a is formed on the address electrode line Rj. The inside of the discharge space is filled with a mixed penning gas.

An address discharge is generated by the address electrode line Rj and the scanning and sustaining electrode line Yi. A face sustaining discharge is generated by the common sustaing electrode line X3j-2 and the scanning and sustaining electrode line Yi.

The R fluorescent layer 121a may be formed on the common sustaining electrode line X3j-2 and the address electrode line Rj.

The operation of the three electrodes face discharge color PDP according to embodiment 1 of the present invention will be described below.

In the three electrodes face discharge type color PDP according to the present invention, charge particles are generated within a discharge space by the address discharge generated between the scanning and sustaining elecrode line Yi and the address electrode line Rj. Accordingly, optimum wall charges are generated on a surface of each electrode lines Yi, Rj. When the wall charges are generated, a face sustaining discharge is continuously generated between the scanning and sustaining electrode line Yi and the common sustaining electrode line X3j-2. An R visible light is generated as a fluorescent body of the R fluorescent layer 121a is excited by a vacuum ultraviolet generated by the face sustaining discharge. Also, a generation of the R visible light is continuously sustained. Thus, an emitting light of the R cell can be shown as the R visible light generated within the discharge space of the R cell is emitted outside.

Although the R cell is described as an example above, internal structures of the G cell and the B cell are almost identical to that of the R cell, except for the G cell and the B cell respectively have the G fluorescence layer 121b and the B fluorescence layer 121c instead of the R fluorescence layer 121a. Also, a B fluorescent layer 121c emitting a blue visible light as the B fluorescent layer is excited by said vacuum ultraviolet rays is formed in the B cell.

As mentioned above, a discharge region of the discharge space is formed up and down as the face discharge is generated between the scanning and sustaining electrode line Yi and the common sustaining electrode line X3j-2 after the wall charge is generated. Accordingly, a discharge interference of an adjacent cell can be minimized.

Also, the visible light passing into the outside is only intercepted by the scanning and sustaining electrode line Yi as the scanning and sustaining electrode line is only formed on the front glass substrate. Accodingly, an intensity of the visible light passing the front glass substrate increases. Therefore, the PDP has enhanced brightnesses of cells and and a whole picture.

Embodiment 2

Figure 9:
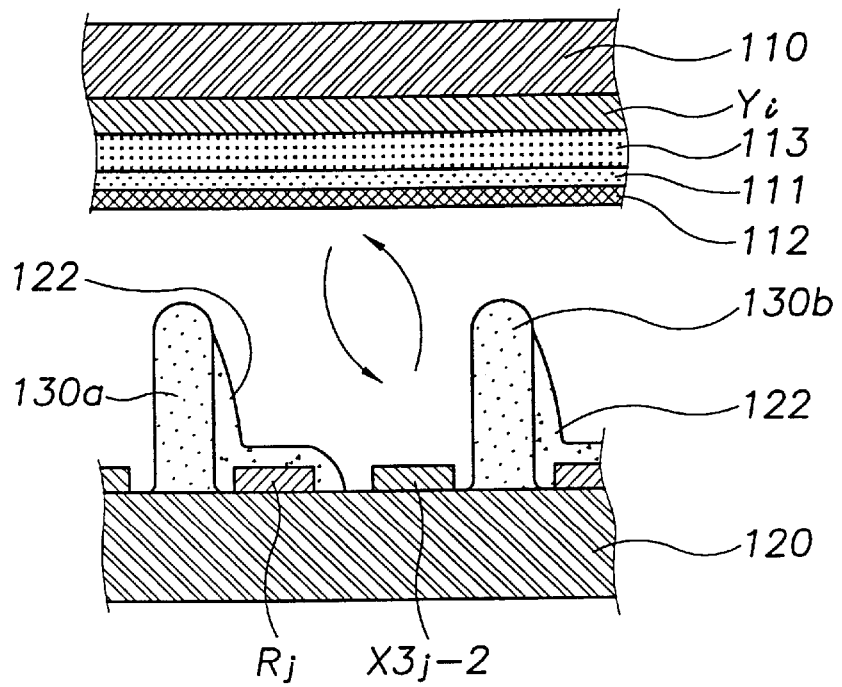
FIG. 9 is a cross-sectional view of a cell $R_{ij}$ by embodiment 2 of the present invention taken along line $C_1$–$C_2$ of FIG. 6.
Figure 10:
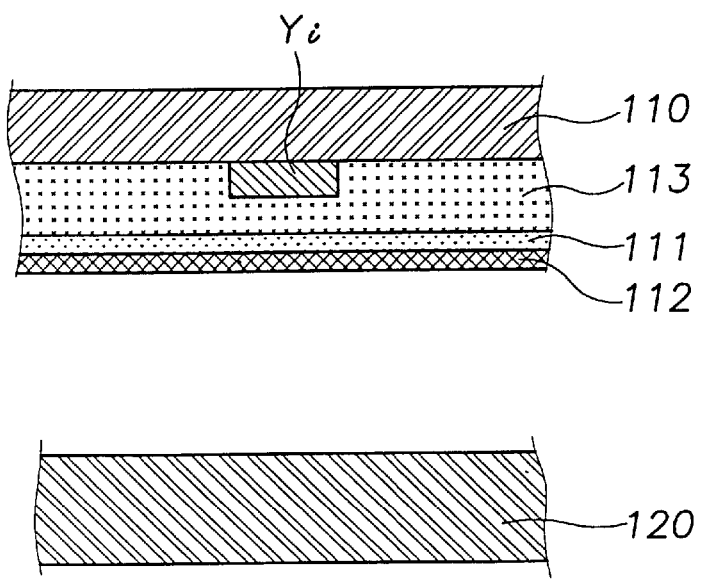
FIG. 10 is a cross-sectional view of a cell $R_{ij}$ by embodiment 2 of the present invention taken along line $D_1$–$D_2$ of FIG. 6.

FIG. 9 is a cross-sectional view of $R_{ij}$ (i is a column and j is a row) by an embodiment 2 of the present invention taken along line $C_1$–$C_2$ of FIG. 6. FIG. 10 is a cross-sectional view of $R_{ij}$ (i is a column and j is a row) by an embodiment 2 of the present invention taken along line $D_1$–$D_2$ of FIG. 6.

Referring to FIGS. 9 and 10, the front glass substrate 110 and the back glass substrate 120 parallely arranged at a predeterminated interval. The scanning and sustaining electrode line Yi is arranged on the front glass substrate 110 facing the back glass substrate 120. The R filter 113 is formed on the scanning and sustaining electrode line Yi,and passes a red visible light of the white visible light emitted from the discharge space into an outside. The dielectric layer 111 is formed on the R filter 113 so as to limit the discharge current and creat the wall charge easily. The MgO protection film 112 is formed on the dielectric layer 111 in order to protect the scanning and sustainig electrode line Yi. Also, the MgO protection film 112 prevents the dielectris layer 111 from being eroded and corroded.

The first partition wall 130a and the second partition wall 130b are arranged between the front glass substrate 110 and the back glass substrate 120 in order to form a discharge space and prevent colors of a cell and an adjacent cell from mixing. The address electrode line Rj and the common sustaining electrode line is parallely formed on the back glass substrate 120 formed between the address electrode line Rj and the common sustaining electrode line X3j-2. The white fluorescent layer 121a is formed on the address electrode line Rj. The inside of the discharge space is filled with the mixed penning gas.

The address discharge is generated by the address electrode line Rj and the scanning and sustaining electrode line Yi. The face sustaining discharge is generated by the common sustaing electrode line X3j-2 and the scanning and sustaining electrode line Yi. Also, the white fluorescent layer 122 emits the white visible light as the white fluorescent layer is excited by vacuum ultraviolet rays occuring when the face sustaing discharge is generated between the scanning and sustaining electrode line Yi and the common sustaining electrode line X3j-2. The white fluorescent layer 122 may be formed on the address electrode line Rj and the common sustaining electrode line X3j-2.

The operation of the three electrodes face discharge type color PDP according to the embodiment 2 of the present invention will be described below.

In the three electrodes face discharge type color PDP according to the present invention, a charge particle is generated within a discharge space by an address discharge generated between the scanning and sustaining elecrode line Yi and the address electrode line Rj. Accordingly, the optimum wall charges are generated on the surface of each of the electrode lines Yi and Rj. When the wall chages are generated, a continuous face sustaining discharge is generated between the scanning and sustaining electrode line Yi and the common sustaining electrode line X3j-2. The white visible light is generated according as the white fluorescent layer 122 is excited by vacuum ultraviolet rays generated by the face sustaining discharge. Also, a generation of the white visible light is continuously sustained. The R filter 113 passes a red visible light of the white visible light emitted from a discharge space into the outside. Thus, an emitting light of the R cell can be shown as the R visible light generated within discharge space of the R cell is emitted outside.

Although the R cell is described as an example above, internal structures of the G cell and the B cell are almost identical to that of the R cell, except for a G filter passing a green visible light of the white visible light excited by the vacuum ultraviolet rays is formed in the G cell instead of the R filter of the R cell, except for a B filter passing a blue visible light of the white visible light excited by the vacuum ultraviolet rays is formed in the B cell instead of the R filter of the R cell.

As mentioned above, a discharge region of the discharge space is formed up and down as a face discharge is generated between the scanning and sustaining electrode line Yi and the common sustaining electrode line after the wall charge is generated. Accordingly, a discharge interference occuring between adjacent cells can be minimized.

Also, the visible light passing into the outside is only intercepted by the scanning and sustaining electrode line Yi as the scanning and sustaining electrode line is only formed on the front glass substrate. Accodingly, an intensity of the visible light passing the front glass substrate increases. Therefore, the PDP has enhanced brightnesses of cells and a whole picture.

And, an unstable white balance occuring by a difference of the luminescence characteristics of R, G and B fluorescent bodies can be prevented by forming the white fluorescent layer 113 within the discharge space of whole cell.

In the three electrodes face discharge type color PDP according to the present invention, the intensity of the visible light passing the front substrate can increases as the common sustaining electrode lines are formed on the back glass substrate. Accordingly, the brightness of the whole picture is enhanced. Also, the discharge region of the discharge space is formed up and down as the face discharge is generated between the scanning and sustaining electrode line Yi and the common sustaining electrode line after the wall charge is generated. Accordingly, the discharge interference occuring between adjacent cells can be minimized. And, the unstable white balance occuring by the difference of the luminescence characteristics of R, G and B fluorescent layers can be prevented by forming the white fluorescent layer within the discharge space of the whole cells and by forming the R, G and B filters generating R, G and B visible light.

Accordingly, an unstable white balance occuring by a difference of the luminescence characteristics of R, G and B fluorescent bodies can be prevented by the white fluorescent bodies formed within the discharge space of the whole cells and by the R, G and B filters generating R, G and B visible light.

Although the preferred embodiments of the present invention have been described, it is understood that the present invention should not be limited to these preferred embodiments, but various changes and modifications can be made by one skilled in the art within the spirit and scope of the invention as hereinafter claimed.

What is claimed is:

1. A three electrodes face discharge type color plasma display panel comprising:
   a front glass substrate and a back glass substrate parallely arranged at a predeterminated interval;
   a plurality of partition walls arranged between said front glass substrate and said back glass substrate to form a plurality of discharge spaces;
   a plurality of scanning and sustaining electrode lines arranged at a predeterminated interval on said front glass substrate facing said back glass substrate in a direction perpendicular to said partition walls;
   a plurality of address electrode lines parallely formed with said partition walls on said back glass substrate, wherein an address discharge is generated by said address electrode lines and said scanning and sustaining electrode lines; and
   a plurality of common sustaining electrode lines parallely formed with said partition walls on said back glass substrate, wherein a face sustaining discharge is generated by said common sustaing electrode lines and said scanning and sustaining electrode lines.

2. The three electrodes face discharge type color plasma display panel as claimed in claim 1, said plasma display panel further comprising R,G and B cells alternately formed at each intersection of said scanning and sustaining electrode lines and said address electrode lines.

3. The three electrodes face discharge type color plasma display panel as claimed in claim 2, said plasma display panel further comprising fluorescent layers formed on said address electrode lines of said R,G and B cells.

4. The three electrodes face discharge type color plasma display panel as claimed in claim 3, wherein said fluorescent layers comprise: a) red (R) fluorescent layers formed on said address elecrode lines of said R cells, wherein said R fluorescent layers emit a red visible light as said R fluorescent layers are excited by a vacuum ultraviolet rays occuring when a face sustaining discharge is generated between said scanning and sustaining electrode lines and said common sustaining electrode lines; b) green (G) fluorescent layers formed on said address electrode lines of said G cells, wherein said G fluorescent layers emit a green visible light as said G fluorescent layers are excited by said vacuum ultraviolet rays; and c) blue (B) fluorescent layers formed on said address electrode lines of said B cells, wherein said B fluorescent layers emit a blue visible light as said B fluorescent layers are excited by said vacuum ultraviolet rays.

5. The three electrodes face discharge type color plasma display panel as claimed in claim 4, wherein said R,G and B fluorescent layers are formed on said common sustaining electrode lines and said address electrode lines formed within said discharge spaces.

6. The three electrodes face discharge type color plasma display panel as claimed in claim 2, said plasma display panel further comprising white fluorescent layers formed on said address electrode lines, wherein said white fluorescent layers emit a white visible light as said white fluorescent layers are excited by said vacuum ultraviolet rays occuring when the face sustaining discharge is generated between said scanning and sustaining electrode lines and said common sustaining electrode lines.

7. The three electrodes face discharge type color plasma display panel as claimed in claim 6, said plasma display panel further comprising a plurality of filters formed on said front glass substrate.

8. The three electrodes face discharge type color plasma display panel as claimed in claim 7, wherein said filters comprise: 1) R filters formed on said front glass substrate formed between two partition walls of said R cells, wherein said R filters pass the red visible light of the white visible light emitted from said white fluorescent layer into an outside; 2) G filters formed on said front glass substrate formed between two partition walls of said G cells, wherein said G filters pass the green visible light of a white visible light emitted from said white fluorescent layer into the outside; and c) B filters formed on said front glass substrate formed between two partition walls of said B cells, wherein said B filters pass the blue visible light of a white visible light emitted from said white fluorescent layer into the outside.

9. A three electrodes face discharge type color plasma display panel comprising:
   a front glass substrate and a back glass substrate parallely arranged at a predeterminated interval;

a plurality of partition walls arranged between said front glass substrate and said back glass substrate to form a plurality of discharge spaces;

a plurality of scanning and sustaining electrode lines arranged at a predeterminated interval on said front glass substrate facing said back glass substrate in a direction perpendicular to said partition walls;

a plurality of address electrode lines parallely formed with said partition walls on said back glass substrate, wherein a address dischrge is generated by said address electrode lines and said scanning and sustaining electrode lines;

a plurality of common sustaining electrode lines parallely formed with said partition walls on said back glass substrate, wherein a face sustaining discharge is generated by said common sustaing electrode lines and said scanning and sustaining electrode lines;

R,G and B cells alternately formed at each intersection of said scanning and sustaining electrode lines and said address electrode lines; and fluorescent layers formed on said address electrode lines of said R,G and B cells.

10. The three electrodes face discharge type color plasma display panel as claimed in claim 9, wherein said fluorescent layers comprise: 1) red (R) fluorescent layers formed on said address elecrode lines of said R cells, wherein said R fluorescent layers emit a red visible light as said R fluorescent layers are excited by a vacuum ultraviolet rays occuring when the face sustaining discharge is generated between said scanning and sustaining electrode lines and said common sustaining electrode lines; 2) green (G) fluorescent layers formed on said address electrode lines of said G cells, wherein said G fluorescent layers emit a green visible light as said G fluorescent layers are excited by said vacuum ultraviolet rays; and 3) blue (B) fluorescent layers formed on said address electrode lines of said B cells, wherein said B fluorescent layers emit a blue visible light as said B fluorescent layers are excited by said vacuum ultraviolet rays.

11. The three electrodes face discharge type color plasma display panel as claimed in claim 10, wherein said R,G and B fluorescent layers are formed on said common sustaining electrode lines and said address electrode lines formed within said discharge spaces.

12. A three electrodes face discharge type color plasma display panel comprising:

a front glass substrate and a back glass substrate parallely arranged at a predeterminated interval;

a plurality of partition walls arranged between said front glass substrate and said back glass substrate to form a plurality of discharge spaces;

a plurality of scanning and sustaining electrode lines arranged at a predeterminated interval on said front glass substrate facing said back glass substrate in a direction perpendicular to said partition walls;

a plurality of address electrode lines parallely formed with said partition walls on said back glass substrate, wherein an address dischrge is generated by said address electrode lines and said scanning and sustaining electrode lines;

a plurality of common sustaining electrode lines parallely formed with said partition walls on said back glass substrate, wherein a face sustaining discharge is generated by said common sustaing electrode lines and said scanning and sustaining electrode lines.

R,G and B cells alternately formed at each intersection of said scanning and sustaining electrode lines and said address electrode lines; and white fluorescent layers formed on said address electrode lines, wherein said white fluorescent layers emit a white visible light as said white fluorescent layers are excited by said vacuum ultraviolet occuring when the face sustaing discharge is generated between said scanning and sustaining electrode lines and said common sustaining electrode lines.

13. The three electrodes face discharge type color plasma display panel as claimed in claim 12, said plasma display panel further comprising a plurality of filters formed on said front glass substrate.

14. The three electrodes face discharge type color plasma display panel as claimed in claim 13, wherein said filters comprise: a) R filters formed on said front glass substrate formed between the two partition walls of said R cells, wherein said R filters pass a red visible light of the white visible light emitted from said white fluorescent layer into an outside; b) G filters formed on said front glass substrate formed between two partition walls of said G cells, wherein said G filters pass a green visible light of the white visible light emitted from said white fluorescent layer into the outside; and c) B filters formed on said front glass substrate formed between two partition walls of said B cells, wherein said B filters pass a blue visible light of the white visible light emitted from said white fluorescent layer into the outside.

\* \* \* \* \*